W. R. WALKER.
PRODUCTION OF REFINED BASIC STEEL.
APPLICATION FILED MAR. 12, 1918.
1,309,162.
Patented July 8, 1919.
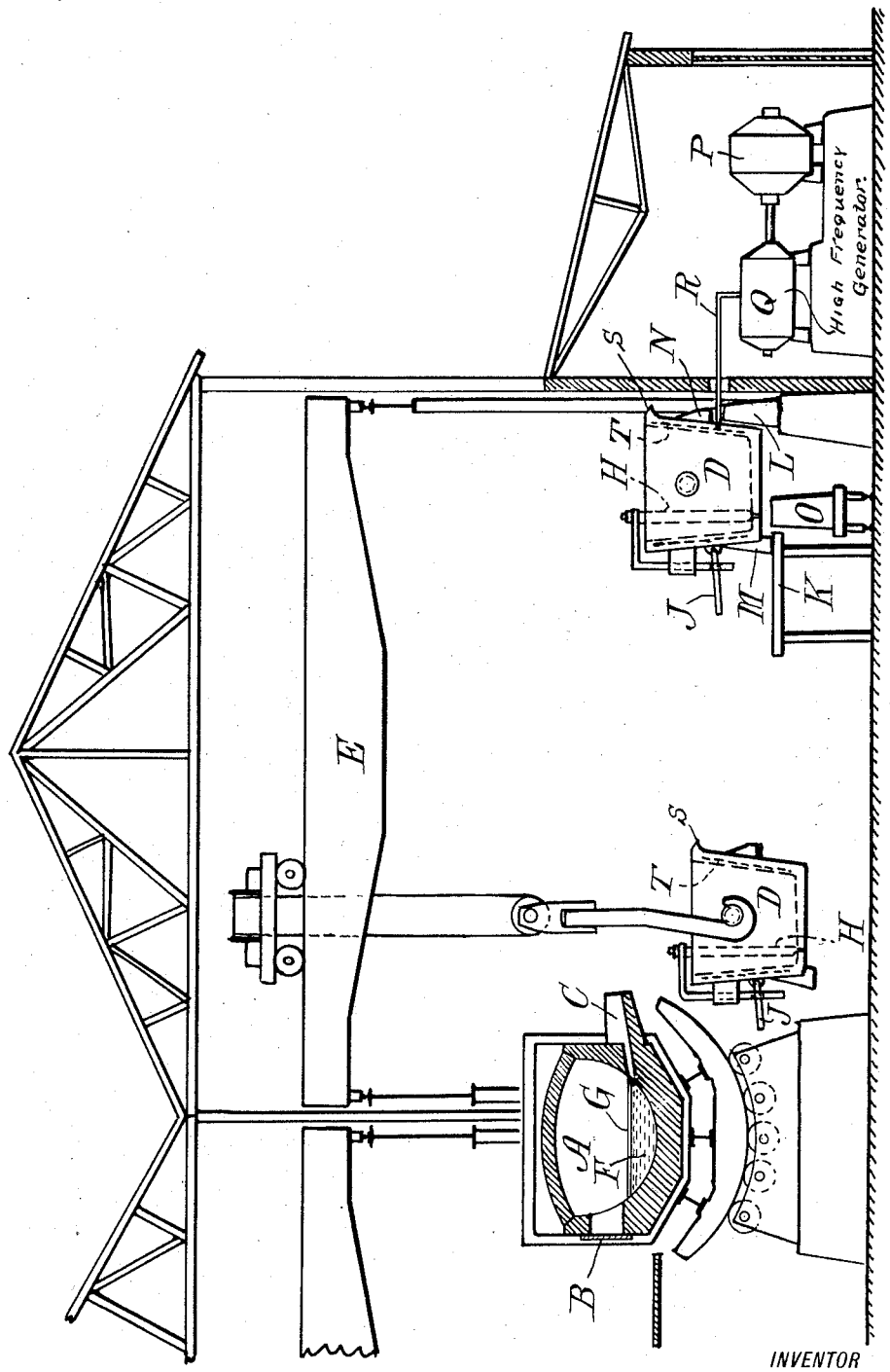
INVENTOR
William R. Walker
BY
D. Anthony Usina — ATTORNEY

UNITED STATES PATENT OFFICE.

WILLIAM R. WALKER, OF NEW YORK, N. Y.

PRODUCTION OF REFINED BASIC STEEL.

1,309,162.      Specification of Letters Patent.      Patented July 8, 1919.

Application filed March 12, 1918. Serial No. 221,950.

*To all whom it may concern:*

Be it known that I, WILLIAM R. WALKER, a citizen of the United States, residing in the city, county, and State of New York, have invented certain new and useful Improvements in the Production of Refined Basic Steel, of which the following is a specification.

In my Patent No. 980,369 of January 3rd, 1911 I have described a method of treating steel in the ladle or other movable vessel by which it is transferred from the converter or open-hearth to the molds, heating it electrically in the ladle in order to hold the steel molten longer than could be done by its natural heat and thus giving time for the usual additions to take effect and for the rise of impurities to the surface and escape of gases. In holding basic steel in the ladle, with the usual slag carried over from the converter or open-hearth, part of the phosphorus in the slag is apt to be reduced and absorbed back into the steel; and the longer the metal is held molten in the ladle the greater will be the amount of phosphorus returned to the steel. The present invention is directed to the artificial heating of the steel in the ladle and the modifying or replacing of the slag so as to retard or prevent absorption of phosphorus by the steel and thus permit the holding of the heat in the ladle long enough to secure the full degree of purification desired,—say, twenty minutes or more in a hundred-ton ladle. Without artificial heating it has been found impossible to hold such steel in the ladle for more than about eleven minutes (assuming the usual temperature in pouring from the open hearth into the ladle, and ladles of usual sizes) without its beginning to freeze before the last moldful can be poured; and this is not sufficient to make the metal as clean as is desired for example for large guns.

Any suitable method of heating the steel in the ladle may be used. I prefer the use of a high-frequency induced electric current apparatus, since it can be simply applied to the ladle without any other effect on the steel than the heating desired and can be operated to heat the steel during the comparatively long period required for pouring from the ladle into the molds. The last steel poured from the ladle is freer from oxids and similar impurities because it has stood longer, but is apt to be higher in phosphorus. By maintaining the supply of artificial heat and the proper slag conditions after the pouring has commenced the usual haste to empty the ladle becomes unnecessary and the last steel poured is quite as free from absorbed phosphorus as the first and is freer from oxids and gases. The ladle is preferably of the ordinary style with a saucer-shaped bottom and this is well adapted to heating by high-frequency induced currents. The oxy-hydrogen or oxy-acetylene flame may also be used for heating, especially in small works where such heating is required only at rather long intervals. Or the electric arc furnace may be used, or various electric resistance devices, or any usual or suitable means for heating. There are certain peculiarities in the use of high-frequency electric induction apparatus which make it advantageous for heating the metal in the ladle. The arc method is good in furnaces where the bath of metal is comparatively shallow and the furnace is not moved from one place to another, but has disadvantages for dead melting in the ladle in the difficulty of introducing the electrode into a movable vessel and in the difficulty of conveying the heat to the bottom of a considerable depth of molten material. The older induction furnaces where the metal was melted in an annular trough forming the secondary element of an electric induction apparatus is objectionable because of the difficulty of maintaining the sides and bottom of a furnace of this shape and for other reasons. In the case of high-frequency current, by which I mean a current of more than 5,000 cycles per second, and generally from 10,000 to 12,000 up, the heating coil or apparatus may be applied immediately under the ladle or around it with little mechanical difficulty and without affecting the composition of the steel. Such a use of the high-frequency current in fact is peculiarly advantageous in holding metal in the ladle at the best temperature for resting and also for pouring not only where basic steel is being made and rephosphorization in the ladle is to be prevented, but also in the making of acid steel where there is no danger of such rephosphorization.

For modifying the slag, various methods may be used.

It is desirable to have the steel ladles made of such a size that they will just hold the heat. The lip S of the ladle should be so constructed that it will be only as short a distance as possible above the surface of the metal. In this way whatever slag is run from the furnace into the ladle will flow out over the lip of the ladle. This gives rise to the danger of the metal's spilling over the side when the ladle is traveling from the furnace to the molds; which can be taken care of by a bridge of iron or fire-brick material to fit into the space where the slag runs out. If the steel should only come up to within one or two inches of the lip, that would leave a small amount of slag on top of the metal. Another way is to hold the ladle slightly tilted while the metal and slag are poured in from the open-hearth furnace. When the ladle is filled sufficiently the slag will flow over the lip. When the slag has passed and the metal commences to flow over the lip the ladle can be turned toward an upright position and these adjustments may be continued so as to pour off the most or all of the slag without losing any of the metal, after which the ladle can be turned to a vertical position so as to carry the metal as far below the level of the lip as possible. If other slag making materials were added to this, then there are several ways of working:

One way is to scrape off the slag remaining on the metal and add an entirely new slag. Another way is to scrape off part of this slag and add partly new slag making materials or molten slag, and in this way dilute the phosphorus in the slag. The phosphorus in the slag will be reduced right at the point of contact between the metal and the slag and the smaller the amount that is brought in contact with the metal the less phosphorus will be reduced back into the metal. To keep this slag from revolving about the surface of the metal and in that way continually bringing more slag in contact with the metal, cold material can be thrown on top of the slag, such as powdered lime, for instance, which would have a more or less chilling effect on the slag, particularly if this lime or other material had been very slightly moistened with water.

Silicate of soda, which would melt at a comparatively low temperature, or even burnt lime or dolomite can be thrown on top of the metal after the slag is removed in order to keep the air from getting at the metal and oxidizing it. As a matter of economy, ground slag from the Bessemer converter can be used, or fire-sand or any substance which would serve as a protecting medium.

In diluting the slag, the lime may be added in the runner of the furnace and mixed with the slag as it runs into the ladle. This would probably be the best way as the lime is more intimately mixed with the slag when the slag is very hot. It could also be thrown in when the slag is on top of the metal in the ladle, but in this latter case it would be necessary to have heat enough to get the slag and lime to intermingle or otherwise the surface of the metal coming in contact with the slag would absorb a similar amount of phosphorus contained in the slag; that is, it would be necessary to prevent a layer of lime resting on top of a layer of slag and not having the two intimately mix. It is not altogether necessary that the lime should be melted and fused with the slag, but the lime and the slag should be intimately mixed so as not to bring the same amount of high phosphorus material in contact with the steel in the ladle.

Various methods may be used for scraping the slag off the ladle or it may be blown off with steam or air or various gases under pressure. In the ordinary open-hearth furnace it is very difficult to keep any of this slag back as it runs out of the furnace with the last of the steel that is running out. It can be done with a skimmer both in the fixed and in the rolling open-hearth types,—but more easily in the rolling type.

If you use a high phosphorus pig iron, you get a slag high in phosphorus. There you would want to remove practically all of the slag. Where you are using a low phosphorus pig iron only a part of the slag would need to be removed, the remaining slag being diluted to the desired extent to prevent absorption of phosphorus by the steel.

In general, the idea is either to make up an entirely new slag in the ladle in which there would be no phosphorus coming in contact with the steel, or to dilute the slag coming over from the converter or open-hearth to say one-quarter or one-third of its regular phosphorus-yielding composition. For example, where slags are high in phosphorus, as in the Birmingham, Alabama, district, it is best to use an entirely new slag in the ladle.

After the metal has been held under dead melting conditions as long as desired and is to be poured into the molds it is important for securing the best steel that it be poured at as low a temperature as possible. In very large ladles, which require a long time for their pouring the first ingot has to be fairly hot in order that the last shall be poured before the steel commences to solidify on the bottom and in the nozzle. My present invention, however, by permitting a long continued holding of the metal molten in the ladle avoids this difficulty. The artificial heat may be applied to keep the metal just above the melting point so that from beginning to end of the pouring operation the metal will be of substantially the same temperature and of the best temperature for pouring. The best way to secure this result is to apply the heat to the bottom of the ladle and to the nozzle.

In referring to additions made to the steel such as ferro-manganese or other additions according to the composition and character of the steel desired it will be understood that the additions may be made in the ladle at the time that the metal is introduced therein, this being the more frequent practice; or they may be introduced, as is sometimes done, into the basic furnace just before pouring the metal into the ladle.

The ladle may be of any usual or suitable design. For the sake of conserving the heat therein it may be provided with a cover for example a dome-shaped cover may be used with an opening therein through which the operator may examine the condition of the steel and slag and through which small quantities may be withdrawn by means of a long handled ladle for test purposes. When the metal in this hand ladle shows that the boiling or bubbling operation has stopped we conclude that practically all the gases have escaped and that the purification is substantially complete. The current, assuming electric heat to be used, may then be cut off. After a little time test ladlefuls will form a scum on the surface of the metal which will indicate to the experienced operator that the right temperature for pouring into the molds has been reached. Another device which may be used for conserving the heat is the insulation by a layer of magnesia compound or other good non-conductor of heat either on the outside of the ladle or between its shell and lining. These expedients are particularly useful where large or deep ladles are used in connection with the application of heat to the top of the metal, as in the arc method of heating. They are also useful, however, where the heat is applied to the bottom and to the nozzle and I prefer to apply the heat to these parts before introducing the metal into the ladle as well as during the pouring operation. The metal is at a comparatively high temperature when introduced into the ladle, and the artificial heat applied need be sufficient only to make up for losses by radiation. The covering or insulating of the ladle as described reduces these losses to a minimum and thus economizes heat consumption.

The phosphorus-free slag which is to be substituted for the basic furnace slag or which is to be used in diluting the latter may be melted beforehand either in a small electric furnace or in any other usual or suitable way.

The process is particularly, though not exclusively, useful in making low carbon steel, say below 0.20 per cent. carbon. When there is more carbon, and this is usually accompanied by more silicon, the carbon and the silicon serve to reduce the oxid of iron and thus clean the steel. When the carbon is lower, in which case silicon is usually absent, the reduction of iron oxid is less and is slower. For such low carbon steel, therefore, this invention, in permitting a long dead melt without rephosphorization is especially useful. In the ordinary method of using electric furnaces a certain amount of carbon is added to the slag; but in the present process this is not necessary and would not be done in making soft steel.

In the accompanying drawing there is illustrated more or less diagrammatically an arrangement of apparatus for carrying out the process. A rolling open-hearth furnace is indicated at A which is charged through a door B and emptied through a spout C into a ladle D carried by an overhead crane E. In the furnace I have indicated a bath of steel F on which is a phosphorus-extracting slag G of the usual composition. The ladle D has a bottom opening or spout which is closed by a stopper H operated from the outside through a lever J.

At another point, within range of the crane, are supports K and L upon which the ladle may rest by means of lugs M and N, with space between the supports for a track carrying cars loaded with ingot molds O, so that the molds may be brought in succession under the spout of the ladle and filled with metal therefrom. Support K forms also a platform from which the operator may manipulate the stopper of the ladle. There may be one or more stations of this sort on which any desired number of ladles can be held. The walls of the ladle are of non-conducting material or are lined with such material and embedded within the wall is a heating coil T with terminals which when the ladle is resting in its pouring position may be connected up with the electrical apparatus. Such apparatus I have indicated diagrammatically by a motor P which drives a generator Q producing a high-frequency current which is communicated to the coil T of the ladle by means of cables R.

The dephosphorizing operation in the open-hearth being completed the metal is poured therefrom into the ladle as indicated at the left of the figure. The slag G is removed or modified as described. Any desired additions are added either in the open-hearth furnace before pouring or in the ladle. The silicate of soda, burnt lime, dolomite or converter slag is then added to protect the surface of the metal if necessary, and the ladle is transported to the stationary position shown at the right, and connected to the cables R from the generator and the current turned on so as to keep the metal molten for the length of time desired. The molds are then run in succession under the ladle and filled.

In order to permit of a continuous running of the open-hearth, a number of stations like that shown at the right may be provided so that several ladles may be held at these stations for any length of time desired, being replaced as they are emptied from time to time by new ladles full of metal brought over from the furnace.

Various other lay-outs of the furnace and other apparatus may be provided and various other designs of the ladle and the means for handling the same and applying artificial heat thereto.

What I claim is—

1. The method of treating basic steel previously made under a phosphorus-extracting slag which consists in holding it molten by artificial heat in a movable vessel with a modified slag adapted to prevent or retard the return of phosphorus into the steel.

2. The method of treating basic steel substantially free from phosphorus which consists in holding it molten by artificial heat in a movable vessel with a substantially phosphorus-free slag until completely refined and then casting.

3. The method of treating low carbon basic steel previously made under a phosphorus-extracting slag which consists in holding it molten by artificial heat in a movable vessel with a modified slag adapted to prevent or retard the return of phosphorus into the steel.

4. The method of producing refined basic steel which consists in treating the metal in a basic furnace or converter under a phosphorus-extracting slag, withdrawing the steel thus formed into a movable vessel with the desired additions, artificially heating the steel in said vessel to maintain it molten and to allow the additions to take effect and to permit the rise of impurities to the surface and the escape of gases, and using in said vessel a modified slag adapted to retard or prevent the return of phosphorus into the steel.

5. The method of producing refined basic steel which consists in treating the metal in a basic furnace or converter under a phosphorus-extracting slag, withdrawing the steel thus formed into a movable vessel with the desired additions and pouring the steel from said vessel into the molds, artificially heating the steel in said ladle during the pouring therefrom to maintain it molten and using in the ladle a modified slag adapted to retard or prevent the return of phosphorus into the steel.

6. The method of producing refined basic steel which consists in treating the metal in a basic furnace or converter under a phosphorus-extracting slag, withdrawing the steel thus formed into a movable vessel with the desired additions, heating the steel in said vessel molten and to allow the additions to take effect and to permit the rise of impurities to the surface and the escape of gases, and using in said vessel a modified slag adapted to retard or prevent the return of phosphorus into the steel.

7. The method of producing refined basic steel which consists in treating the metal in a basic furnace or converter under a phosphorus-extracting slag, withdrawing the steel thus formed into a movable vessel with the desired additions, heating the steel in said vessel by means of a high-frequency induced electric current to maintain the steel molten and to allow the additions to take effect and to permit the rise of impurities to the surface and the escape of gases, and using in said vessel a modified slag adapted to retard or prevent the return of phosphorus into the steel.

8. The method of producing refined steel which consists in treating the metal in a furnace or converter, withdrawing the steel thus formed into a movable vessel with the desired additions, heating the steel in said vessel by means of a high-frequency induced electric current to maintain the steel molten and to allow the additions to take effect and to permit the rise of impurities to the surface and the escape of gases.

9. The method of treating basic steel previously made under a phosphorus-extracting slag which consists in holding it molten by artificial heat in a movable vessel with a modified slag adapted to prevent or retard the return of phosphorus into the steel, continuing this operation until the gases therein cease to escape, allowing the steel to cool to a proper pouring temperature and then pouring the same.

In witness whereof, I have hereunto signed my name.

WILLIAM R. WALKER.